United States Patent [19]

Shaw et al.

[11] 4,349,870

[45] Sep. 14, 1982

[54] MICROCOMPUTER WITH PROGRAMMABLE MULTI-FUNCTION PORT

[75] Inventors: Pern Shaw; Fuad H. Musa, both of Austin, Tex.

[73] Assignee: Motorola, Inc., Schaumburg, Ill.

[21] Appl. No.: 72,739

[22] Filed: Sep. 5, 1979

[51] Int. Cl.³ .............................................. G06F 3/00
[52] U.S. Cl. .................................................. 364/200
[58] Field of Search ... 364/200 MS File, 900 MS File, 364/ 716, 712, 706

[56] References Cited

U.S. PATENT DOCUMENTS

| | | | |
|---|---|---|---|
| 4,016,548 | 4/1977 | Law et al. | 364/200 |
| 4,020,472 | 4/1977 | Bennett et al. | 364/200 |
| 4,028,682 | 6/1977 | Weber et al. | 364/900 |
| 4,041,473 | 8/1977 | Bardotti et al. | 364/200 |
| 4,079,452 | 3/1978 | Larson et al. | 364/200 |
| 4,087,855 | 5/1978 | Bennett et al. | 364/200 |
| 4,093,993 | 6/1978 | Sato | 364/712 |

OTHER PUBLICATIONS

Garrow et al., "The Super Component": the one-board computer with programmable I/O, Electronics 2/5/76, pp. 77-84.
Motorola M6800 Microprocessor Applications Manual, 1975, pp. 3-8-3-28.

*Primary Examiner*—Raulfe B. Zache
*Attorney, Agent, or Firm*—Anthony J. Sarli, Jr.; Vincent B. Ingrassia; Jeffrey Van Myers

[57] ABSTRACT

A single-chip microcomputer comprises a CPU (1), a RAM (2), a ROM (3), a timer (4), serial I/O communication logic (5), four I/O ports (11-14) and various power supply, clock, and control inputs. One of the I/O ports (13) is user programmable by application of specific signals to mode selection pins (P20-22) for configuration in several possible ways. The programmable port comprises a plurality of lines which each may be individually programmed as input or output lines to peripheral equipment associated with the microcomputer. Alternatively, the port lines can be programmed to serve as a bidirectional data bus to external memory. Alternatively, the port lines can be programmed to be multiplexed data and address lines to external memory. Bus arbitration logic is provided to route data to the CPU from either on-chip memory or external memory.

6 Claims, 15 Drawing Figures

MICROCOMPUTER WITH PROGRAMMABLE MULTI-FUNCTION PORT

RELATED INVENTIONS (1) Ser. No. 939,742, filed Sept. 5, 1978, of Groves et al, entitled NRZ/Biphase Microcomputer Serial Communication Logic and assigned to the assignee of the present invention.

(2) Ser. No. 939,741, filed Sept. 5, 1978, of Daniels et al, entitled Microprocessor Having Plural Internal Data Busses and assigned to the assignee of the present invention.

(3) Ser. No. 047,674, filed June 12, 1979, of R. R. Thompson entitled Microcomputer With MPU-Programmable EPROM.

TECHNICAL FIELD

This invention relates generally to the field of data processing and, more particularly, to a single-chip microcomputer having a programmable, multi-function port.

BACKGROUND ART

Microcomputers are sophisticated, general purpose logic devices which can be programmed to perform a wide variety of useful control functions in industrial and communications equipment, large-scale and medium-scale computer peripheral and terminal hardware, automobiles and other transportation media, amusement and education devices, and the like. Generally, an entire spectrum of microcomputers is presently available in the commercial marketplace. The MC6801 microcomputer which is commercially available from Motorola, Inc., is an 8-bit microcomputer comprising a CPU, 128 bytes of random access memory (RAM), 2K bytes of read only memory, a 16-bit timer, and four I/O ports for communicating with external equipment.

It is known in the microcomputer technology to provide dual functions for individual pins of the microcomputer chip. For example, the 8085A single-chip microcomputer commercially available from Intel Corporation employs a multiplexed address/data bus. The eight pins used as the external data bus connection are also used to carry the low-order address bits. In the Intel 8085A the multiplexed data/address capability is fixed, and the lines dedicated for such purpose cannot be used for other purposes.

It is desirable to provide a plurality of different functions to a port comprising a set of I/O pins in a microcomputer, which functions may be selectively programmed by the microcomputer user by application of appropriate programming information into the microcomputer, since in the commercial environment it is important to provide a diversity of possible configurations to the end user, while at the same time minimizing the total number of I/O pins in the microcomputer to minimize the production costs thereof.

BRIEF SUMMARY OF THE INVENTION

It is an object of the present invention to provide a programmable, multi-function port in a single-chip microcomputer.

It is another object of the present invention to provide circuitry within a microcomputer for selectively programming a programmable, multi-function port.

These and other objects of the invention are achieved in accordance with a preferred embodiment of the invention by providing a microcomputer comprising a processor, an internal memory, a bidirectional data bus, an address bus, and a programmable, multi-function port.

The microcomputer of the present invention comprises an eight-pin port (port 3) which is capable of being configured as (1) an I/O port in which each pin can be individually programmed as input or output, (2) a bidirectional data port, or (3) a multiplexed port for data and low-order address lines. The desired configuration is user-selectable by application of appropriate signal levels to mode programming pins of the microcomputer. When operating as a data port or as a multiplexed address/data port, the programmable, multi-function port utilizes a bus arbitration circuit for determining whether data is to be routed to the CPU from on-chip memory or registers or from off-chip memory.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF THE INVENTION

Figure 1:
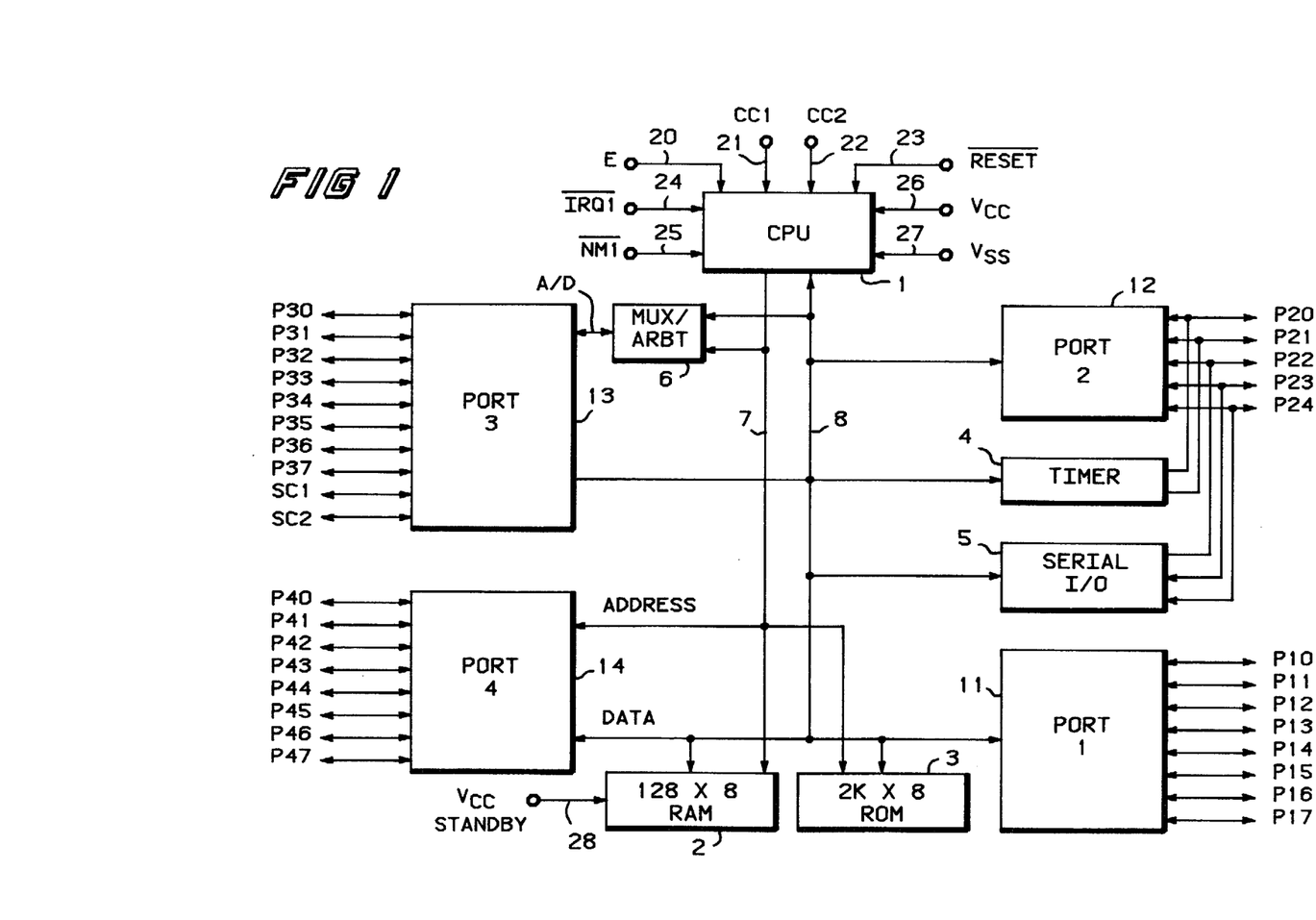
FIG. 1 shows a block diagram of a single-chip microcomputer which embodies the present invention.

With reference to FIG. 1, a block diagram of the single-chip microcomputer embodying the present invention is shown. In a preferred embodiment of the invention, the microcomputer comprises the MC6801 or MC68701 commercially available from Motorola, Inc. The MC6801 contains 2K×8 bits of read-onlymemory (ROM), and the MC68701 contains 2K×8 bits of erasable programmable read-only-memory (EPROM).

The microcomputer shown in FIG. 1 comprises a central processor (CPU) 1, a random acess memory (RAM) 2, a read-only-memory (ROM) 3, a timer circuit 4, and a serial I/O portion 5 as major functional blocks. The microcomputer shown in FIG. 1 also comprises a multiplexer/bus arbitrator (MUX/ARBT) 6, an internal address bus 7, an internal data bus 8, and four I/O ports 11-14. CPU 1 may be connected to an external crystal through crystal connections CC1 and CC2, and it supplies an external clock signal E to other system components. CPU is also responsive to a $\overline{\text{RESET}}$ signal over line 23, an interrupt request signal $(\overline{\text{IRQ1}})$ over line 24, a non-maskable interrupt signal $(\overline{\text{NMI}})$ over line 25, a power supply signal ($V_{CC}$) over line 26, and a ground signal ($V_{SS}$) over line 27. The RAM 2 receives a $V_{CC}$ standby supply over line 28 to preserve data in the RAM in the event of a power failure.

Ports 1, 3, and 4 are 8-bit ports, and port 2 is a 5-bit port. The eight lines, P10-P17, into port 1 are dedicated solely to parallel I/O operations. The lines into ports 2-4 may be configured in different ways depending upon one of eight possible modes a operating the microcomputer shown in FIG. 1. Port 2 has five lines P20-P24. Port 3 has eight lines P30-P37 and two strobe control lines, SC1 and SC2. Control lines SC1 and SC2 into port 3 serve as input and output strobes. Port 4 has eight line P40-P47.

In the single chip mode (mode 7) all I/O lines of ports 2-4 can be programmed to serve either as inputs or outputs, in accordance with a data direction register associated with each port. In the expanded non-multiplexed mode (mode 5) lines P30-P37 of port 3 function as the external data bus (D0-D7), and lines P40-P47 of port 4 serve as the low-order address lines (A0-A7). If any of the eight address lines are not needed in this mode the remaining lines may be configured as I/O. In the expanded multiplexed mode (mode 6), lines P30-P37 of port 3 serve both as the external data bus (D0-D7) and as the low-order address bus (A0-A7). In this mode, lines P40-P47 of port 4 serve as the high-order address lines (A8-A15). If any of the eight high-order address lines are not needed in this mode the remaining lines may be configured as I/O.

Figure 8:
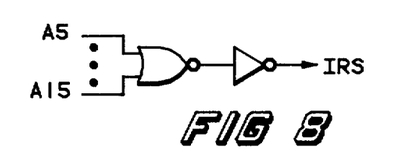
FIG. 8 shows a logic diagram for generating the internal register select (IRS) signal used by the port 3 logic circuity.

In all three of the above mentioned modes, lines P20-P24 of port 2 can be configured either as input or output lines by a data direction register associated with this port. Port 2 also provides access to the serial I/O communications capability and the programmable timer capability of the microcomputer. Pins P20-P22 of port 2 are used to select the operational mode of microcomputer 30 during reset. When $\overline{\text{RESET}}$ goes high, pins P20-P22 latch the signal levels applied to them as mode control signals PC0-PC2. The mode control register circuitry for pins P20 and P21 is identical to that shown for pin P22 in FIG. 8G of the above-referenced Ser. No. 939,742.

Figure 2:
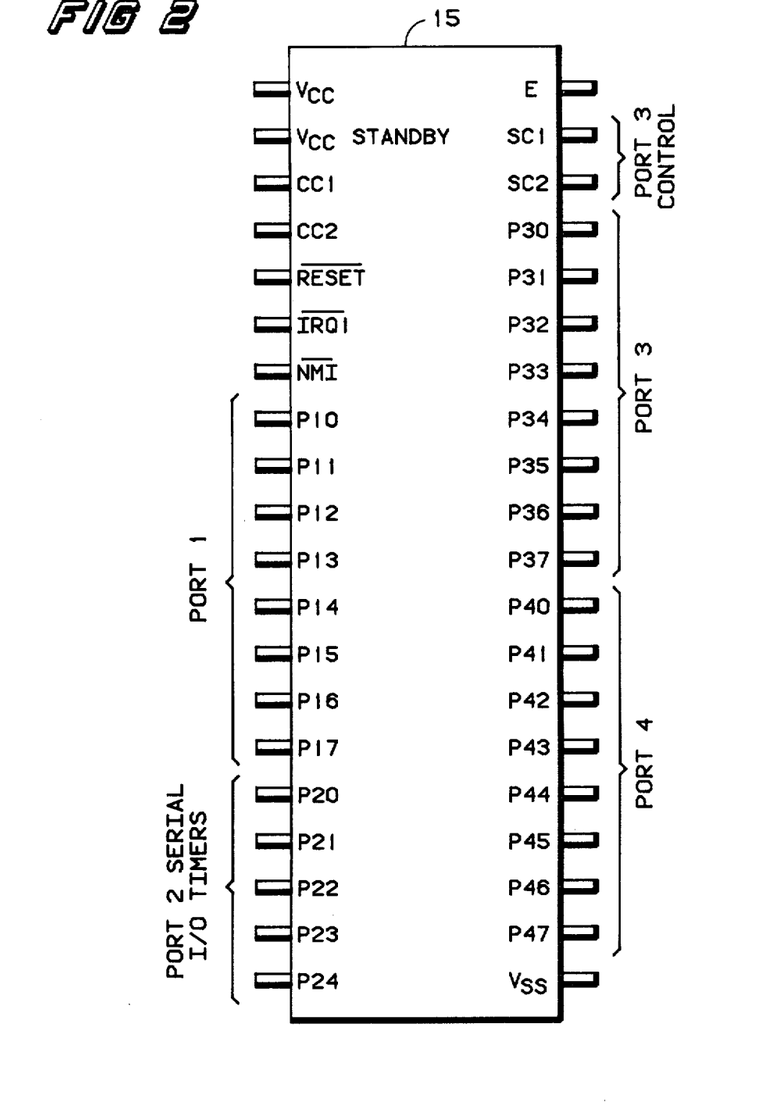
FIG. 2 illustrates a pin-out arrangement of the single-chip microcomputer which embodies the present invention.

FIG. 2 provides a schematic representation 15 of the pin-out arrangement of the microcomputer of FIG. 1.

Figure 3:
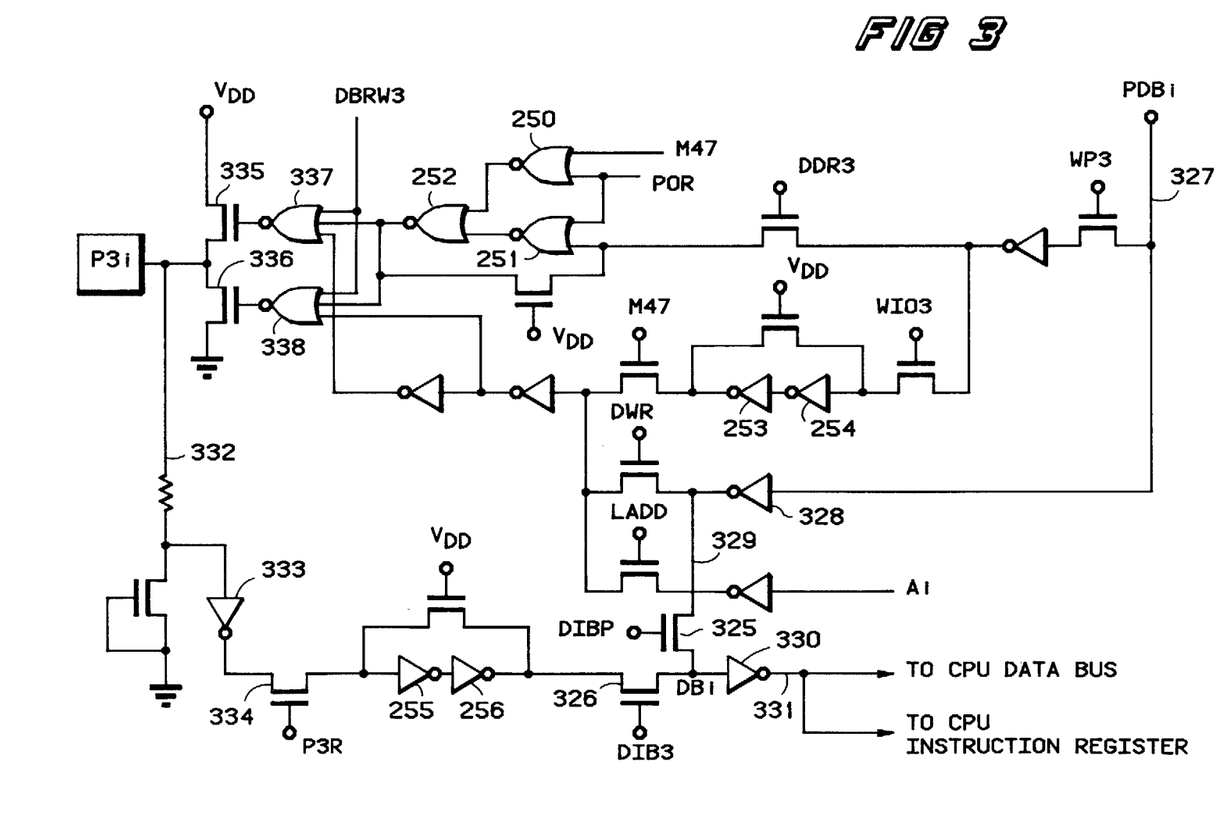
FIG. 3 shows a logic diagram of a representative one of the programmable, multi-function port (port 3) buffers.

FIG. 3 shows a logic diagram of a representative one of the port 3 I/O buffers. Port 3 is a programmable multi-functional 8-bit port that serves, depending upon the microcomputer mode, as an I/O port with handshake, as a data port, or as a multiplexed address and data port. Port 3 comprises two major functional blocks, including the I/O buffer circuitry shown in FIG. 3 and the control logic shown in FIGS. 4 and 5.

In FIG. 3, NOR gates 250-252 form a data direction register. Inverters 253 and 254, connected in a feedback arrangement, form an output data register. Inverters 255 and 256, also coupled in a feedback arrangement, form an input data register. Gates 325 and 326, controlled by signals DIBP and DIB3, respectively, serve a bus arbitration function during an CPU read, and allow data to go to the CPU from the peripheral data bus or from the port 3 pins. Each pin of port 3 also has a tristate output driver which includes transistors 335 and 336 and NOR gates 337 and 338. Both the output data register and the data direction register are only active in the single-chip modes, modes 4 and 7. In all other modes, the output signals (either data or addresses) are fed directly to the output drivers, and the control line DBRW3 replaces the output of the data direction register in determining when the output drivers go to a high impedance state.

A functional description of the operation of port 3 will now be given for each mode as follows:

PORT 3 OPERATION IN THE SINGLE CHIP MODE (MODE 7) AND SINGLE CHIP TEST MODE (MODE 4)

The active mode control signals in FIG. 3 that are associated with these two modes are:

| | |
|---|---|
| M47 | A mode select signal for modes 4 and 7. |
| POR | (Power On Reset). This is the internal reset signal synchronized with φ1. |
| WP3 | (Write to Port 3). This signal goes high to indicate a CPU write to either the output data register or the data direction register. |
| WIO3 | This signal, after a ½ cycle delay, goes high to indicate a CPU write to the output data register. |
| DDR3 | This signal, after a ½ cycle delay, goes high to indicate a CPU write to the data direction register. |
| DIBP | This couples the Peripheral Data Bus (PDB) to the CPU's internal data bus during CPU read operations whenever the CPU addresses internal memory or internal registers (addresses $0000 to $001F, excluding the port 3 output data register at address $0006). |
| DIB3 | This signal couples the data from the input data register of port 3 to the CPU's internal data bus during a CPU read operation whenever DIBP is not active. |
| P3R | This is the port 3 input latch signal. It is enabled by the Latch Enable bit (SR3) of the port 3 Control/Status Register ($000F). If this bit is cleared, P3R will stay high. If this bit is set, P3R will drop low on a negative transition of the input to the $\overline{\text{IS3}}$ pin (described regarding FIG. 9), thus latching the input data to port 3. P3R will stay low until the port 3 input register is read by the CPU. |

The reset signal clears the port 3 data direction register and the Control/Status Register, causing all of port 3's pins to be configured as inputs. Each pin is individually programmable as an input or output. This is accomplished by writing a 1 to the data direction register for those bits that are to be outputs, and writing a 0 to the data direction register for those bits that are to be inputs. The data direction register of port 3 is a write-only register.

When the CPU writes to port 3's data direction register or output data register, WP3 goes high on E. One-half cycle later, on $\overline{\text{E}}$, either WIO3 or DDR3 will go high, depending on whether the CPU was addressing the output data register or the data direction register, respectively. The ½ cycle delay in the data path prevents the data direction register or the output data register from receiving any transients due to the precharge on the PDB. In the two single chip modes, M47 is always high, and therefore the output data register is always connected to the output buffer. During a CPU read operation, since DIB3 is conditioned by DIBP, the data present in the input data register of port 3 will be transferred to the CPU's internal data bus when either the port 3 output data register is addressed ($0006) or no other internal memory or register is addressed.

There is a software programmable option to enable latching of the I/O data input to port 3. If the Latch Enable bit of the port 3 Control/Status Register is set, then a negative transition of the signal input to the $\overline{IS3}$ pin will cause P3R to drop low from its normally high state, thus latching the data present at port 3 in the input data register. P3R will return high on the $\overline{E}$ following a CPU read of the port 3 data register, and new input data can then enter the input data register. P3R is set high on reset.

PORT 3 IN THE EXPANDED MULTIPLEXED MODES (MODES 1, 2, 3, AND 6)

In these modes, M47 is always low, thereby disconnecting the output data register from the output buffer, and inhibiting the data direction register from controlling the high impedance state of the output buffer. The low state of M47 also forces the Latch Enable bit of the port 3 Control/Status Register to be cleared, causing P3R to be always high.

Since the operation of DIB3 and DIBP is based on whether an address location is internal or external to the microcomputer, any changes in address definitions will cause these two signals to operate in a slightly different way from that defined for the single chip modes. However, their function remains the same. In the expanded multiplexed modes, all of the port 3 register addresses (output data register, $0006; data direction register, $0004; port 3 I/O Control/Status Register, $000F) are treated as external address locations. In modes 1, 2, and 3, since port 4 is always outputting high byte address, the register addresses of port 4 (output data register, $0007; data direction, $0005) are also treated as external addresses. In mode 6, since port 4 is programmable as either I/O inputs or high byte address outputs, the port 4 register addresses are treated as internal to the microcomputer. Other address locations that change with mode are the ROM (external addresses in modes 2 and 3), the RAM (external addresses in mode 3), and the interrupt vectors, address $FFF0 to $FFFF (external addresses in modes 1, 2, and 3).

In addition to those signals defined above with respect to modes 4 and 7, there are three additional control signals that are active in the expanded multiplexed modes:

| | |
|---|---|
| DBRW3 | This signal controls the three-state input to the output drivers. During $\overline{E}$, this signal follows Address Strobe (AS), but on E it follows the R/$\overline{W}$ signal. The output drivers write addresses onto the bus during AS, and for CPU write operations they output data during E. For CPU read operations, they stay in a high impedance state during E. |
| LADD | This control signal is used to load the low byte addresses (A0–A7) into the port 3 output drivers. It is active during $\overline{E}$. |
| DWR | This signal couples the internal PDB into the port 3 output driver. It is active during E. |

The operation of these control signals is as follows:

In the expanded multiplexed modes, low byte addresses are coupled into the port 3 output drivers through the LADD couplers. The Address Strobe (AS) signal, through DBRW3, enables the output drivers to output the low byte addresses. During E, when AS is low, the output drivers are in a high impedance state.

It should be observed that the CPU always writes to the PDB. During E, data is always coupled from the PDB to the output drivers through the DWR coupler. If the CPU is reading, DBRW3 will force the output drivers to stay in a high impedance state during E. However, if the CPU is writing, DBRW3 will go low, and data will be output to the external data bus. Therefore, when the CPU writes, the output data is accessible to either internal or external address locations.

During E of a CPU read operation, DBRW3 forces the port 3 output buffers into a high impedance state. The DIBP logic will decode the address to determine if it is an internal location. The definition of internal address locations varies both with the mode of operation and with the available mask programmable options of RAM and ROM locations. If the address is determined to be an internal location, the DIBP signal will couple the PDB into the CPU's internal bus during E. If the location is not an internal location, the DIB3 signal will couple the data from the port 3 input data register to the CPU's internal bus during E.

PORT 3 IN THE EXPANDED MULTIPLEXED TEST MODE (MODE 0)

Figure 5:
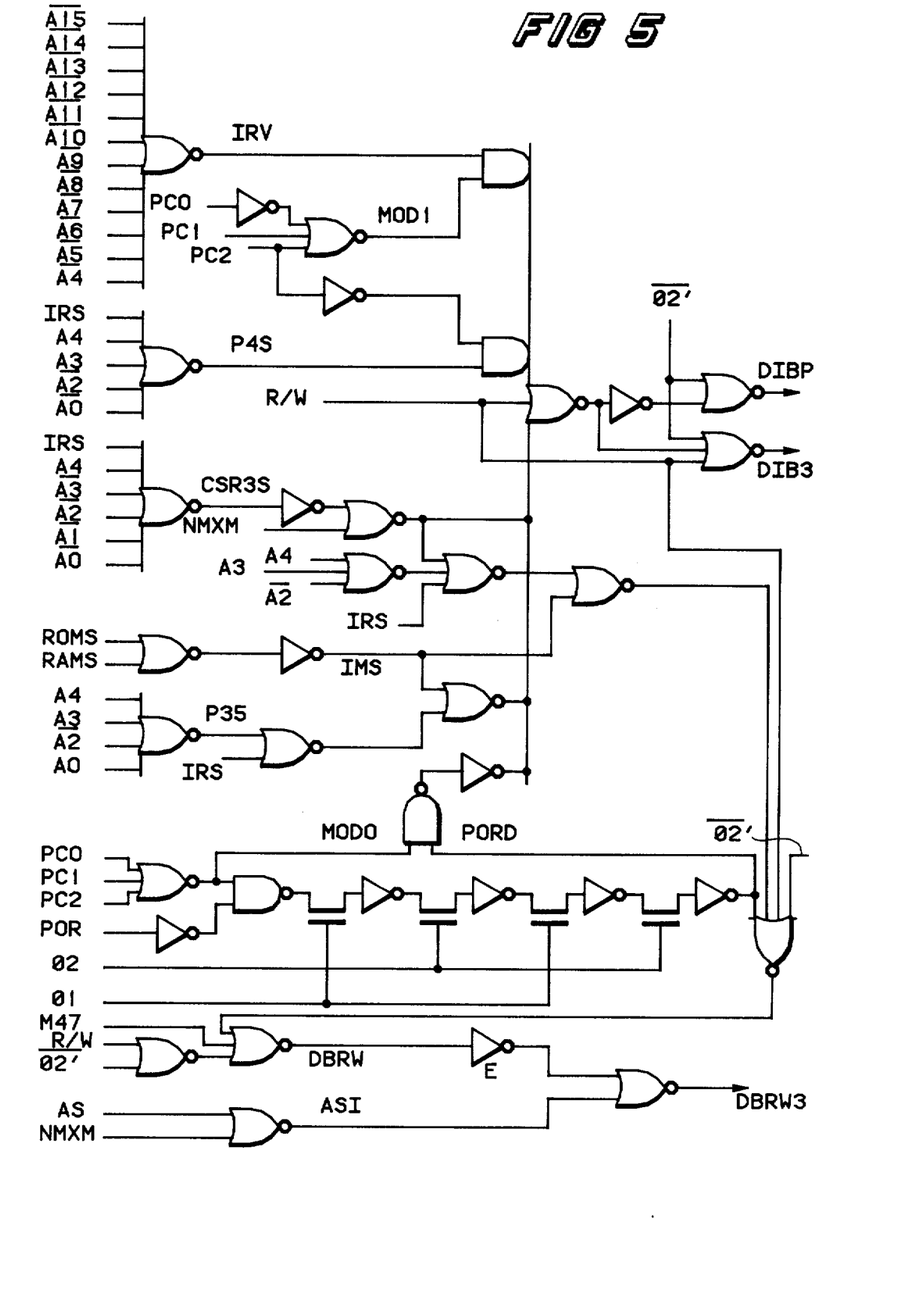

In the test mode, port 3 and its associated control logic function the same as they do in the normal Expanded Multiplexed Mode (mode 6) with the following exceptions:

(1) A two cycle delay is added to the reset (POR) signal in the DBRW3 and the DIBP logic (as shown in FIG. 5). The first two cycles after reset switches to high, when the CPU is fetching the Restart Vector (addresses $FFFE and $FFFF), DBRW3 will force port 3 to be an input during E, and DIBP will couple the external data into the MPU. Since the Restart Vector is supplied from external memory, external test programs can be executed.

(2) In order to monitor the data that the CPU reads from internal memory and registers, the address decode logic is incorporated into the DBRW3 logic. This causes port 3 to output data whenever the CPU reads internal memory or registers. For this function, internal addresses are defined as the ROM, the RAM, and the first 32 bytes of registers (addresses $0000 to $001F), excluding the port 3 and 4 output data registers ($0006, $0007) and data direction registers ($0004, $0005), and the port 3 Control/Status Register ($000F). The exclusion of the port 3 and 4 registers is useful not only for testing, but also for initial system prototyping and debugging.

PORT 3 IN THE EXPANDED NON-MULTIPLEXED MODE (MODE 5)

In this mode, LADD is inhibited by the mode select logic, and DBRW3 is a function of R/$\overline{W}$ and E only.

Port 3 becomes a bi-directional data port and functions like the bi-directional data pins of the commercially available MC6800 microprocessor. During E, port 3 is always in a high impedance state. During E̅, port 3 becomes an output for CPU write operations and an input for CPU read operations.

Figure 4:
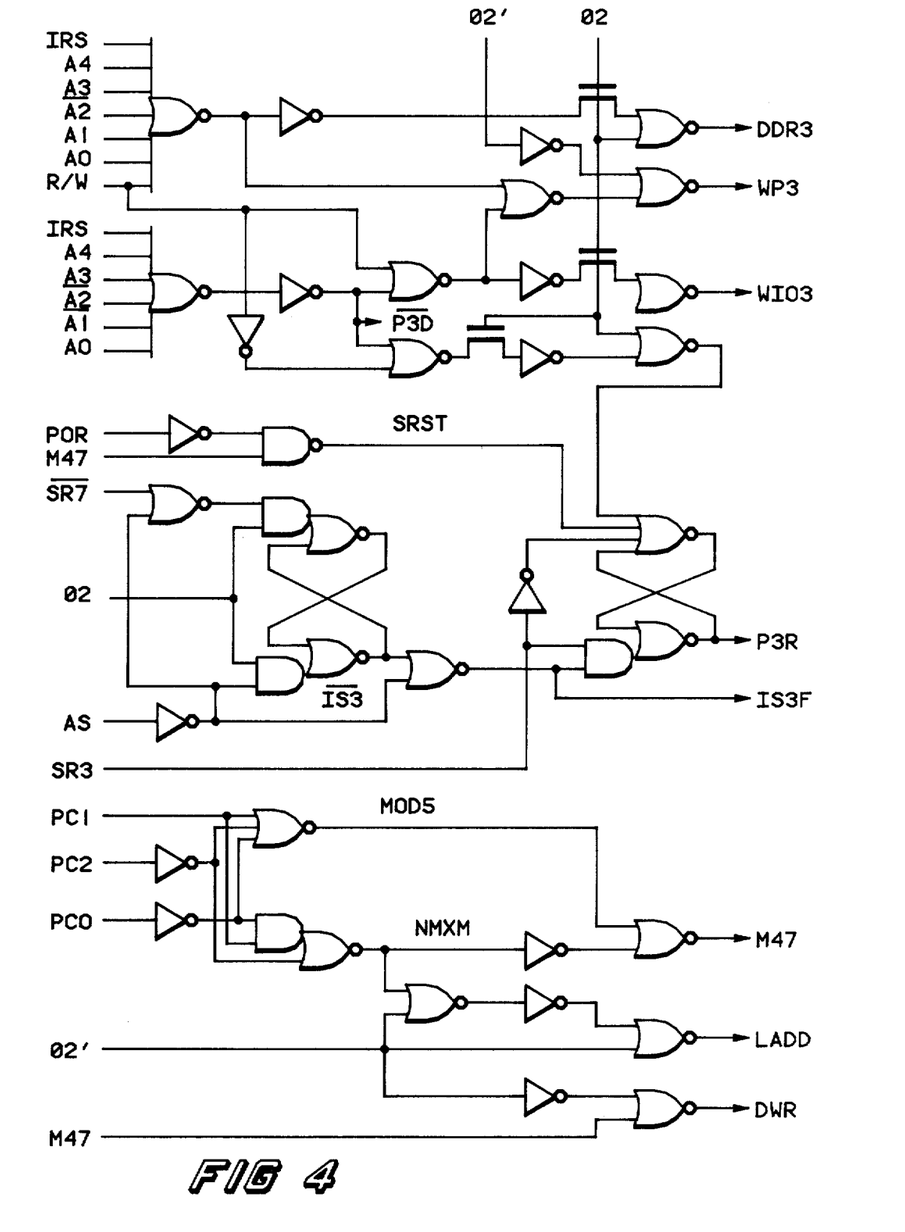
FIGS. 4 and 5 show logic diagrams illustrating the port 3 control logic.

FIGS. 4 and 5 show the control logic for generating the various control signals used to control the operation of port 3. In FIG. 4 the $\overline{SR7}$ signal is the $\overline{IS3}$ flag bit. It is a read-only status bit which is stored in the port 3 Control/Status Register which is set by the falling edge of the input strobe $\overline{IS3}$. It is cleared by a read of the port 3 Status/Control Register, followed by either a read or write to port 3. It is also cleared by the POR signal.

Figure 6:
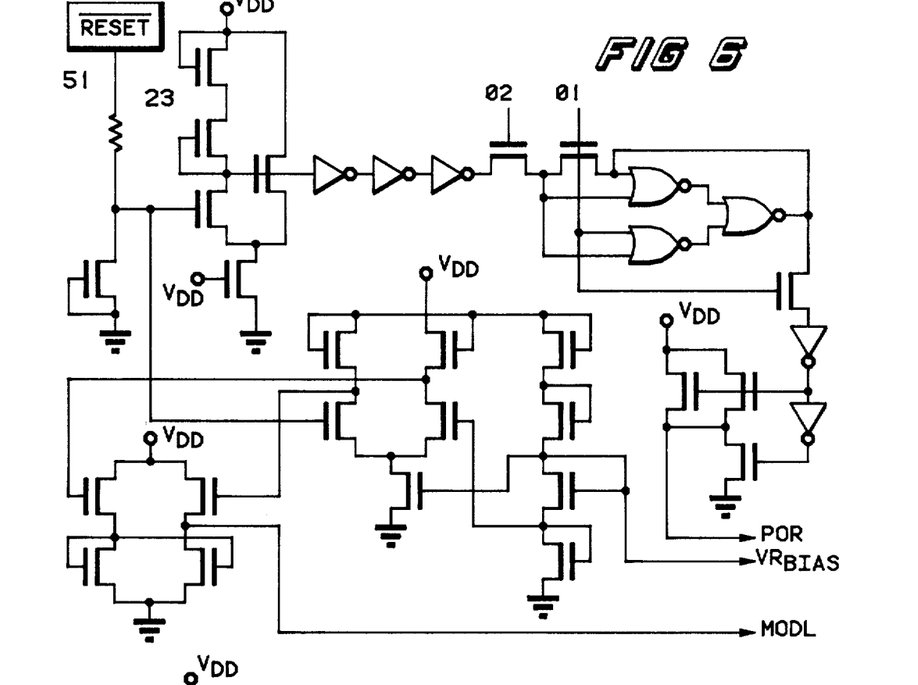
FIG. 6 shows a combined logic and circuit diagram of a portion of the $\overline{\text{RESET}}$ circuit.

FIG. 6 shows a combined logic and circuit diagram of a portion of the reset circuit. $\overline{RESET}$ 51 supplies the $\overline{RESET}$ signal over line 23. The circuit shown in FIG. 6 also generates POR (Power-On Reset), VRBIAS, and MODL signals. The VRBIAS and MODL signals are transmitted, among other places, to the port 2 circuitry shown in FIGS. 8G and 8H in the above-referenced Ser. No. 939,742.

Figure 7:
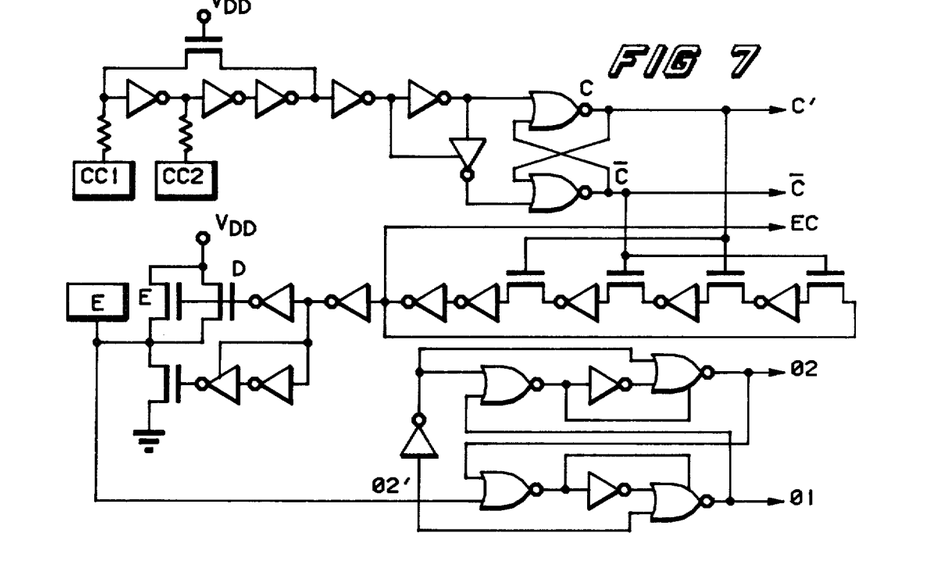
FIG. 7 shows a logic diagram illustrating the clock generating circuitry.

FIG. 7 shows a logic diagram of the circuit for generating the microcomputer clocks. The clock generator consists of a two-pin crystal oscillator connected between pins CC1 and CC2, a divide-by-four circuit, internal $\phi 1$ and $\phi 2$ generators, and an E ($\phi 2'$) generator which supplies signals for internal and external use. The internal signal is called $\phi 2'$. Externally, the E generator is capable of driving 90 pf and one TTL load. The oscillator can also be driven by a TTL gate.

FIG. 8 shows a logic diagram for generating the internal register select (IRS) signal which is employed as a control signal in both the port 3 and the port 4 control logic. The IRS signal is low when an internal register within the address space $0000-$001F is selected for a read or write operation.

Figure 9:
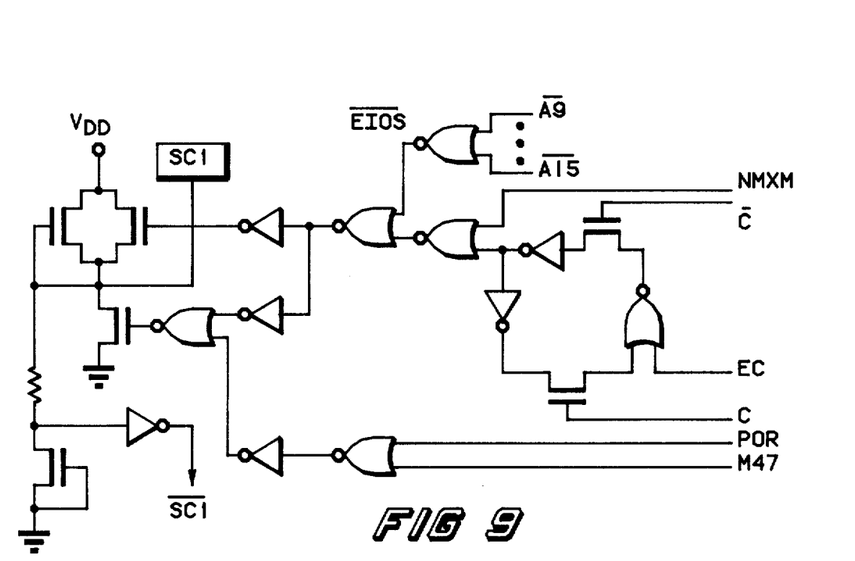
FIG. 9 shows a logic diagram of the strobe control 1 buffer circuit.
Figure 11:
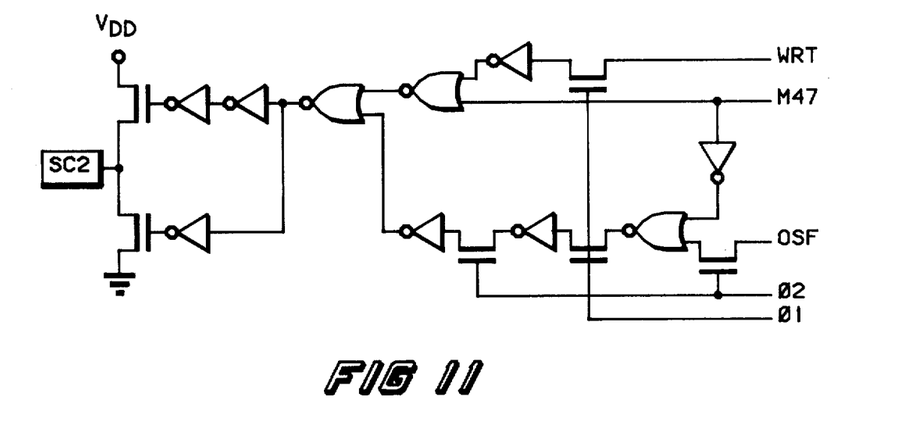
FIG. 11 shows a logic diagram of the strobe control 2 buffer circuit.

FIG. 9 shows a logic diagram of the strobe control 1 (SC1) buffer circuit for generating an SC1 signal, and FIG. 11 shows a logic diagram of the strobe control 2 (SC2) buffer circuit. The strobe control pins, SC1 and SC2, are multipurpose pins that provide both input and output strobes to indicate that valid data is at the pins of the MC6801. The function of SC1 and SC2 depends on the mode of operation.

Figure 10:
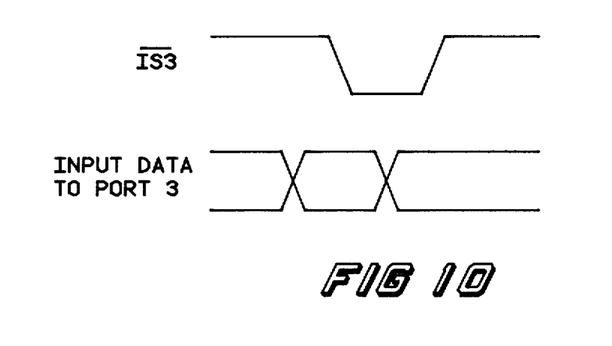
FIG. 10 shows a timing diagram of the input strobe $\overline{\text{(IS3)}}$ for CPU read and write operations.

With reference first to SC1, when port 3 is a multiplexed address and data port (modes 0, 1, 2, 3, and 6), SC1 provides an address strobe to enable latching valid addresses during E. In mode 5, SC1 becomes an external memory/register select $\overline{(EIOS)}$ signal. The external memory/register select signal $\overline{(EIOS)}$ in FIG. 9 represents an address decoding signal for memory locations $0100-$01FF. In modes 4 and 7, the single chip modes, SC1 becomes an Input Strobe $\overline{(IS3)}$ to indicate that valid data being input to port 3 should be latched. A timing diagram of IS3 with respect to CPU read and write operations is shown in FIG. 10.

In FIG. 9 signals C and C̅ represent the two-phase non-overlapping clock provided by the clock circuitry shown in FIG. 7. This clock drives a divide-by-two circuit that provides a 50% duty cycle squarewave with half the frequency of the crystal oscillator. The EC signal generated by the clock circuitry of FIG. 7, representing a logically true equivalent of the E signal, is used to force the Address Strobe signal low when signal E is high. In FIG. 9 the NMXM and M47 signals are provided by the circuitry of FIG. 4.

With reference to FIG. 11, the SC2 pin provides a R/W̅ signal for all modes except for the single chip modes, modes 4 and 7. In these two modes, SC2 is an Output Strobe $\overline{(OS3)}$ that indicates either that valid I/O data is being output from port 3 or that input I/O data has been accepted at port 3. Except for modes 4 and 7, SC2 is just a buffered output of the internal R/W̅ signal. When SC2 is performing the $\overline{OS3}$ function in modes 4 and 7, the output is normaly high but drops low for one cycle when a handshake condition for port 3 exists. The handshake condition is defined by the port 3 Control/Status Register. If bit 4 of the port 3 Control/Status Register is cleared, the Output Strobe is generated on a CPU read from port 3. If bit 4 of the port 3 Control/Status Register is set, the Outpot Strobe occurs on a CPU writ to port 3.

Figure 15:
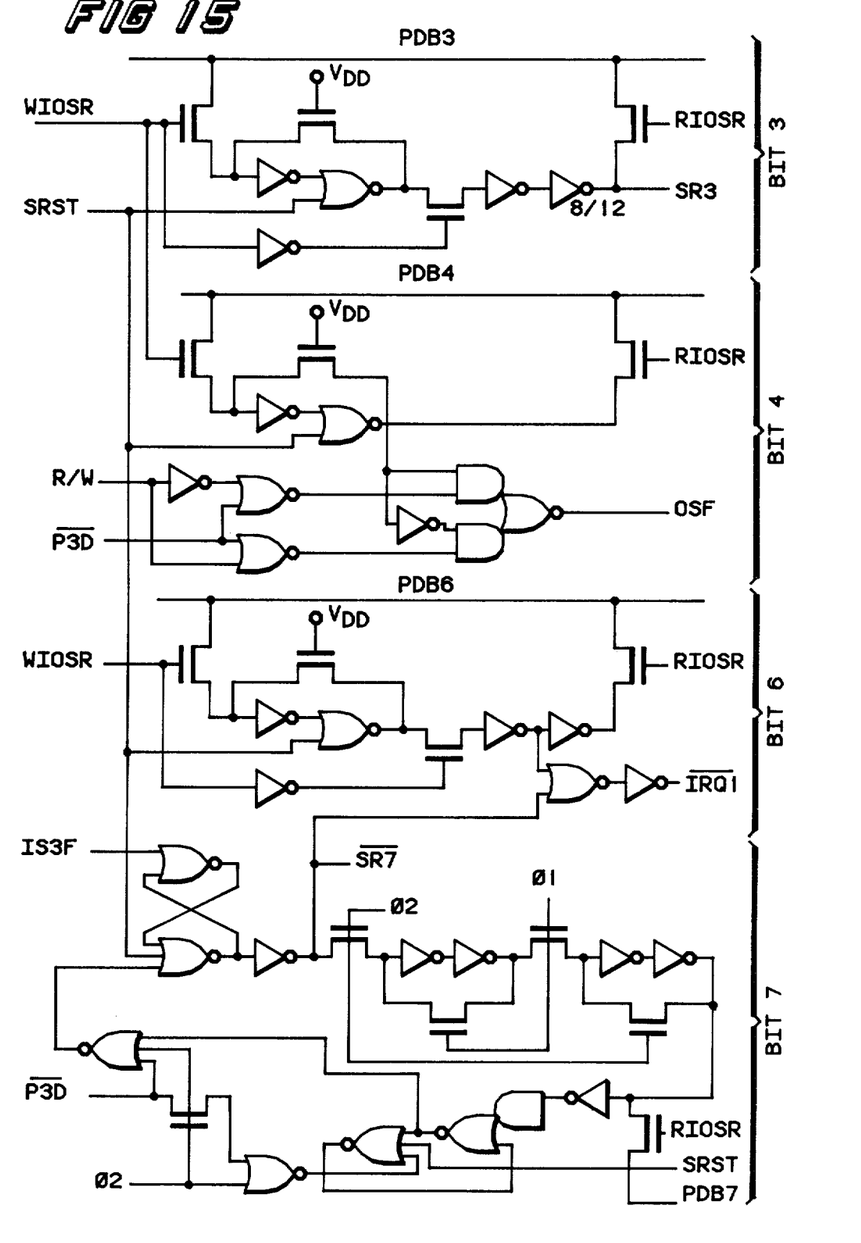
FIG. 15 shows a logic diagram of the port 3 Control/Status Register.

In FIG. 11, the WRT signal is generated by the CPU instruction decoding logic, the OSF signal is generated by the port 3 Control/Status Register of FIG. 15, and the M47 signal is generated by the port 3 control logic shown in FIG. 4.

Figure 12:
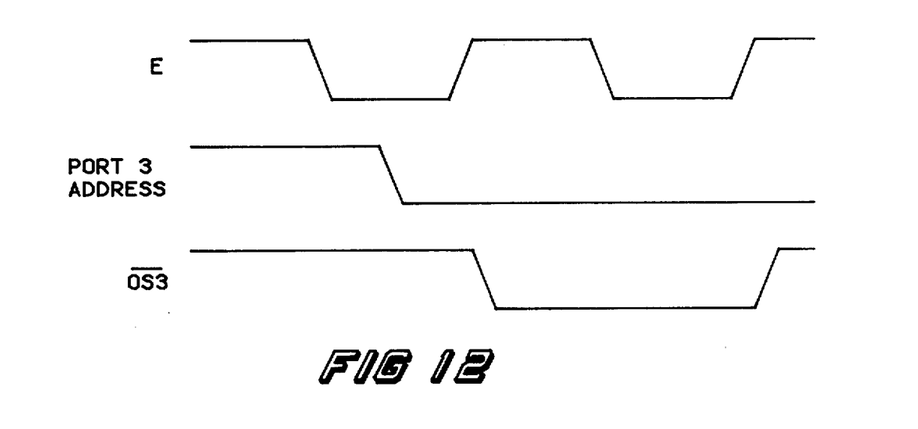
FIG. 12 shows a timing diagram of the output strobe $\overline{\text{(OS3)}}$ for CPU read and write operations.

FIG. 12 shows the timing relationship between the port 3 address signals, $\overline{OS3}$, and the E clock for a CPU read or write operation.

Figure 13:
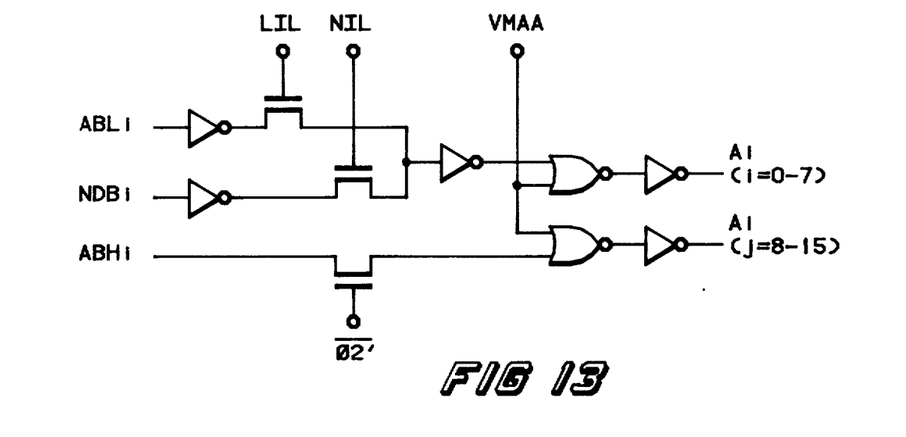
FIG. 13 shows a logic diagram of the address bus interface between the CPU and the low-order address lines.

FIG. 13 shows a logic diagram of an interface circuit between the CPU and the low-order address lines. In the MC6801 microcomputer the address lines coming from the CPU are qualified by VMA (Valid Memory Address) such that they ae always high (at address $FFFF) unless the address is valid. The address lines are internally routed as necessary to the on-chip memory and to the address decoders for the various registers located on the chip. The address lines are also routed to I/O ports 3 and 4 for output in the expanded modes. The address comes from either the NDB (New Data Bus) or the ABL (Address Bus Low). The signals LIL and NIL are generated by the CPU's random logic, and occur during $\phi 1$. VMAA is also generated by the CPU's random logic, and goes low for a full cycle when a valid address is output from the CPU. The high-order eight addresses are internally generated in the CPU on the ABH (Address Bus High), and the interface circuit for these lines is also shown in FIG. 13. These addresses are latched during $\phi 1$ (by signal $\phi 2'$) and are also qualified by VMAA.

Figure 14:
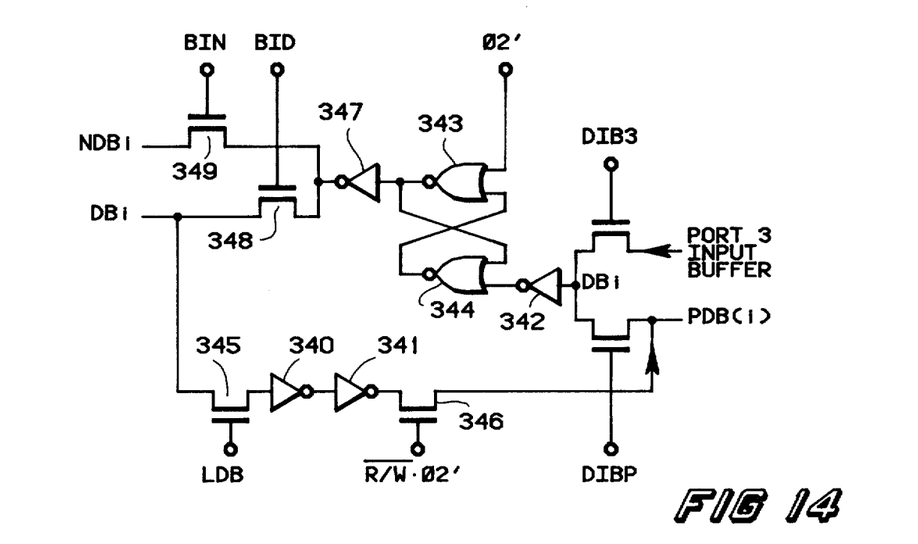
FIG. 14 shows a logic diagram of the data bus interface between the CPU, the peripheral data bus (PDB), and the port 3 bus arbitrator circuit.

FIG. 14 shows a logic diagram of an interface between the CPU internal busses, the PDB, and the port 3 bus arbitrator. Referring again to FIG. 1, the block diagram of the internal data bus structure of the MC6801 microcomputer shows that the internal functional blocks (i.e., the CPU, ROM, RAM, Serial I/O, Timer, and Ports 1-4) are all tied to a common Peripheral Data Bus (PDB). The PDB is a dynamic bus that is precharged high during $\phi 1$ and carries valid data during $\phi 2$. Functionally, the PDB corresponds to the data bus going to memory and peripheral parts in a conventional MC6800 system.

The CPU always writes to the PDB, and, if the MC6801 is operating in an expanded mode, port 3 will output the data present on the PDB. However, during a read cycle, port 3 serves as a bus arbitrator in that, depending on the mode option and the address selected by the CPU, port 3 will divert either the PDB or the data present at port 3's input pins into the CPU. That is, if the address selected by the CPU is an internal memory location, port 3 will divert the PDB into the CPU. If the address selected by the CPU is an external memory location, and if the MC6801 is operating in an expanded mode, port 3 will divert the data present at its pins into the CPU.

With specific reference to FIG. 14, signal DBi comes from the bus arbitrator of port 3 and represents logically true data from either the PDB or the pins of port 3. This data is latched at the end of $\phi 2$ and remains valid for the following $\phi 1$. LDB, BIN, and BID are signals generated by the CPU's random logic. LDB goes high on the $\phi 1$ preceeding a data write by the CPU. BIN an BID on high on the $\phi 1$ following a read by the CPU.

The DB (Data Bus) and the NDB (New Data Bus) are internal dynamic busses of the MPU. They are precharged high during $\phi 2$ and carry valid data during $\phi 1$. During a write operation, the CPU always outputs data from the DB. The data is loaded into the gate of inverter 340 by the LDB coupler 345 during $\phi 1$. It is dynamically stored there until the $\overline{R/W} \cdot \phi 2$ coupler 346 opens. The data is then transferred through inverter 341 to the PDB during $\phi 2$.

During a read operation, the input data (from the bus arbitrator of port 3) is buffered by inverter 342 and is then applied to the Set-Reset flip-flop formed by NOR gates 343 and 344. This flip-flop is held in a reset state by $\phi 2$. When $\phi 2$ goes low, if the data is a 1, then the S-R flip-flop is set, or if the data is a 0, then the flip-flop remains reset. The output of NOR gate 343 is buffered by inverter 347 and is directed (during $\phi 1$) to either the DB or the NDB by the BID coupler and BIN coupler 349, respectively.

The purpose of the S-R flip-flop is to prevent indeterminate logic levels from reaching the CPU. Its operation is as follows. Assume the output of inverter 342 is an indeterminate logic level, $V_{iz}$. During 02, the output of NOR gate 343 is 0. Therefore, the output of NOR gate 344 is solely determined by the output $V_{iz}$ of inverter 342, and the output of gate 344 will reach an equilibrium point at an indeterminate voltage, $V_{iNI}$. When $\phi 2$ goes low, then the output of NOR gate 343 is determined by the output $V_{iNI}$ of NOR gate 344. The output of gate 343 will start to rise to an indeterminate voltage level. The output of gate 343 is applied to the input of gate 344 where it adds to the existing input, $V_{iz}$, from inverter 342. NOR gate 344 will be shifted from its equilibrium point, and its output will drop. Because of the positive feedback of the cross-coupled arrangement, this process will continue until NOR gates 343 and 344 achieve a stable state, with the output of gate 344 at a valid 0, and the output of gate 343 at a valid 1. Thus, an indeterminate logic level input will always result in a valid 0 reaching the CPU's data busses.

FIG. 15 shows a logic diagram of the port 3 Control/Status Register. The bit definition of the port 3 Control/Status Register is shown below.

| Bit $000F | 7 | 6 | 5 | 4 | 3 | 2 | 1 | 0 |
|---|---|---|---|---|---|---|---|---|
| | IS3 FLAG | IS3 ENABLE | X | OSS | LATCH ENABLE | X | X | X |

Note that bits 0, 1, 2, and 5 are not used. The port 3 Control/Status Register is only active in modes 4 and 7, and in all other modes it is latched in reset.

Bit 3, the Latch Enable bit, controls the input latch for I/O port 3. If this bit is set, input data to port 3 will be latched with the falling edge of the Input Strobe ($\overline{IS3}$). The latch is "re-opened" with a CPU read of I/O port 3. The Latch Enable bit is cleared on reset.

Bit 4, the Output Strobe Select (OSS) bit, will select whether an Output Strobe will be generated by a read or write to port 3. When this bit is cleared, the strobe is generated by a read. When this bit is set, the strobe is generated by a CPU write to port 3. This bit is cleared on reset.

Bit 6, the IS3 interrupt enable bit, may be used to enable an $\overline{IRQ1}$ interrupt in response to the falling edge of the input strobe ($\overline{IS3}$). When this bit is cleared, an interrupt will not be generated even though the $\overline{IS3}$ flag may be set. If bit 6 is set, an $\overline{IRQ1}$ interrupt will be pending whenever the $\overline{IS3}$ flag bit is set. This bit is also cleared on reset.

Bit 7, the $\overline{IS3}$ flag bit, is a read-only status bit that is set by the falling edge of the Input Strobe ($\overline{IS3}$). It is cleared by a read of the port 3 Control/Status Register, followed by either a read or write to port 3. Reset also clears this bit.

It will be apparent to those skilled in the art that the disclosed Microcomputer With Programmable Multi-Function Port may be modified in numerous ways and may assume many embodiments other than the preferred form specifically set out and described above. Accordingly, it is intended by the appended claims to cover all modifications of the invention which fall within the true spirit and scope of the invention.

What is claimed is:

1. In a microcomputer comprising:
   a processor;
   a memory for storing data at selected addresses;
   a bidirectional data bus comprising a plurality of data lines coupled to the processor and to the memory, for transferring data between the processor and the memory; and
   an address bus comprising a plurality of address lines coupled to the processor and to the memory, for transferring addresses from the processor to the memory; and
   a programmable multi-function port for selectively coupling the data and address buses to a plurality of input/output lines, comprising:
      coupling means coupled to the data bus, the address bus, and the input/output lines, for coupling selected ones of the data lines to respective ones of the input/output lines in response to a first enable signal, for coupling each of the data lines to respective ones of the input/output lines in response to a second enable signal, and for coupling each of the address lines to respective ones of the input/output lines in response to a third enable signal; and
      mode control means coupled to the coupling means, for selectively providing the first, second and third enable signals.

2. The microcomputer as recited in claim 1, wherein said mode control means comprises:
   a mode control register for storing information representing one of the modes of operation of the port, the mode control register being coupled to the coupling means and providing the enable signal corresponding to the mode of operation indicated by the stored information; and
   means for receiving control signals indicating a desired one of the modes of operation of the port, and for loading said mode control register with information representing the desired mode of operation of said port.

3. The microcomputer as recited in claim 2, wherein said means for loading said mode control register comprises at least one of the input/output lines of said microcomputer.

4. A single-chip microcomputer comprising:

a processor;

an on-chip memory for storing information at selected addresses;

an address bus comprising a plurality of address lines coupled to the processor and to the memory, for transferring addresses from the processor to the memory;

a bidirectional data bus comprising a plurality of data lines coupled to the processor and to the memory, for transferring data between the processor and the memory;

a programmable multi-function port for selectively coupling the data and address lines to a plurality of input/output lines, comprising:

coupling means coupled to the address bus, the data bus, and the input/output lines, for coupling selected ones of the input/output lines to respective ones of the data lines in response to a first enable signal, for coupling each of the input/output lines to respective ones of the data lines in response to a second enable signal, and for coupling each of the input/output lines to respective ones of the address lines in response to a third enable signal;

control logic coupled to the coupling means, for providing the first enable signal in response to a first mode signal, for providing the second enable signal in response to a second mode signal, and for sequentially providing the third and second enable signals in response to a third mode signal; and means for selectively providing said first mode signal to configure said port as an input/output port in which said input/output lines may be individually programmed as input or output lines, said second mode signal to configure said port as a bidirectional data port, and said third mode signal to configure said port as a multiplexed data/address port.

5. The single-chip microcomputer as recited in claim 4, wherein said means for providing the mode signals are coupled to one or more of said input/output lines, and provide said mode signals in response to predetermined mode control signals applied to said input/output lines.

6. The single-chip microcomputer as recited in claim 4 wherein the control logic provides, in response to said third mode signal, said third enable signal and thereafter provides said second enable signal only in response to one or more predetermined addresses on said address bus.

* * * * *